United States Patent
Varoglu et al.

(10) Patent No.: US 9,344,989 B2
(45) Date of Patent: May 17, 2016

(54) SYSTEM WITH WIRELESS MESSAGES TO ENHANCE LOCATION ACCURACY

(75) Inventors: Devrim Varoglu, Santa Clara, CA (US); Ravisastry Parupudi, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 739 days.

(21) Appl. No.: 13/605,747

(22) Filed: Sep. 6, 2012

(65) Prior Publication Data

US 2014/0066091 A1    Mar. 6, 2014

(51) Int. Cl.
*H04W 24/00* (2009.01)
*H04W 64/00* (2009.01)
*G01S 19/10* (2010.01)
*G01S 19/48* (2010.01)

(52) U.S. Cl.
CPC .............. *H04W 64/00* (2013.01); *G01S 19/10* (2013.01); *G01S 19/48* (2013.01)

(58) Field of Classification Search
CPC ...... H04W 64/00; H04W 4/02; G01S 5/0252; G01S 5/02; G01S 3/02; G01S 3/04; G01S 19/10; G01S 19/48; H04L 29/08657; G06Q 30/02; G06Q 30/0276; G06Q 30/0267; G07B 15/063
USPC ......... 455/456.1, 57.11, 66.1, 422.1; 340/442
See application file for complete search history.

(56) References Cited

U.S. PATENT DOCUMENTS

| | | | |
|---|---|---|---|
| 6,034,641 A | 3/2000 | Kudoh et al. | |
| 6,489,888 B1 | 12/2002 | Honeck et al. | |
| 7,382,274 B1 | 6/2008 | Kermani et al. | |
| 8,179,281 B2 | 5/2012 | Strauss | |
| 8,587,454 B1 * | 11/2013 | Dearworth | 340/928 |
| 8,836,580 B2 * | 9/2014 | Mendelson | 342/463 |
| 2007/0032245 A1 | 2/2007 | Alapuranen | |
| 2007/0268155 A1 | 11/2007 | Holmes et al. | |
| 2008/0033805 A1 * | 2/2008 | Padin | 705/14 |
| 2008/0045234 A1 | 2/2008 | Reed | |
| 2008/0208444 A1 * | 8/2008 | Ruckart | G01C 21/005 701/412 |
| 2009/0247186 A1 * | 10/2009 | Ji et al. | 455/456.1 |
| 2011/0093330 A1 * | 4/2011 | Burckart | G06Q 30/02 705/14.46 |
| 2011/0110338 A1 * | 5/2011 | Khoryaev et al. | 370/335 |

(Continued)

OTHER PUBLICATIONS

Hisaka, et al., "A Strudy of On-board Sensing System using RSSI for Intersection Safety," TRB 2012 Annual Meeting, Submission date Nov. 15, 2011 (14 pages).

*Primary Examiner* — Mahendra Patel
(74) *Attorney, Agent, or Firm* — Treyz Law Group, P.C.; G. Victor Treyz; Zachary D. Hadd (57) ABSTRACT

Electronic equipment in a system may transmit and receive wireless advertisement messages. Each wireless message may include location information and may have an associated received signal strength indicator when received from transmitting equipment by receiving equipment. The transmitting equipment may be associated with stationary equipment such as equipment installed at a building, adjacent to a road, or in traffic control equipment or other traffic structures. The receiving electronic equipment may be mobile equipment such as a vehicle or mobile computing equipment such as a cellular telephone or portable computer. Satellite navigation system signals may be received by the receiving electronic equipment in addition to the wireless messages. The receiving electronic information can present alerts to a user based on a location determined using the wireless messages and the satellite navigation system signals.

14 Claims, 12 Drawing Sheets

(56) References Cited

U.S. PATENT DOCUMENTS

| | | |
|---|---|---|
| 2011/0171912 A1 | 7/2011 | Beck et al. |
| 2011/0189980 A1* | 8/2011 | Proulx et al. ............... 455/414.1 |
| 2011/0195701 A1 | 8/2011 | Cook et al. |
| 2011/0223931 A1* | 9/2011 | Buer et al. ................. 455/456.1 |
| 2011/0244802 A1 | 10/2011 | Kozlowski et al. |
| 2012/0083998 A1 | 4/2012 | Kizaki |
| 2012/0112895 A1 | 5/2012 | Jun |
| 2013/0083679 A1* | 4/2013 | Krishnaswamy ...... G08G 1/093 370/252 |
| 2013/0297195 A1* | 11/2013 | Das ........................ G08G 1/163 701/117 |
| 2014/0062724 A1 | 3/2014 | Varoglu et al. |

\* cited by examiner

SYSTEM WITH WIRELESS MESSAGES TO ENHANCE LOCATION ACCURACY

BACKGROUND

This relates generally to electronic equipment and, more particularly, to electronic equipment with wireless circuitry that can be used by the equipment to identify the location of the equipment.

Electronic devices are sometimes provided with satellite navigation system capabilities. For example, cellular telephones may be provided with Global Positioning System (GPS) receivers. The GPS receiver in a cellular telephone may be used to ascertain the location of the cellular telephone. Applications such as mapping applications can use the location information to pinpoint a user's location on a map.

In situations such as those involving roads with branches, GPS systems in vehicles can have difficulties in accurately determining which branch of the road a vehicle is located on. As a result, commercially available GPS solutions may not provide sufficient resolution to determine when a vehicle has exited a freeway.

In cities, the presence of tall buildings can make it difficult to receive an accurate GPS signal. Tall buildings create what is sometimes referred to as an urban canyon environment. In an urban canyon environment, the presence of buildings and landscaping can block the open sky from view by a GPS receiver. Reflections can also degrade GPS signals by causing multipath interference. As a result, GPS location information can be slow or impossible to obtain.

To address the problems associated with using GPS signals to ascertain a user's location in an urban canyon environment, some cellular telephones use signals from nearby cellular telephone towers or information about nearby WiFi® hotspots to help determine the user's location. Schemes such as these may require the use of hardware that consumes excessive power.

It would therefore be desirable to be able to provide improved ways in which to ascertain the location of electronic equipment and to use the location to provide services to a user of the electronic equipment.

SUMMARY

Electronic equipment in a system may transmit and receive wireless messages. Each wireless message may include location information. When messages are received from transmitting equipment by receiving equipment, the receiving equipment can assess message signal strength using received signal strength indicator information associated with the received messages.

Transmitting equipment in the system may be associated with stationary equipment such as equipment installed at a building, adjacent to a road, or in traffic control equipment or other traffic structures. By placing transmitting equipment at suitable locations, the transmitting equipment can help receiving equipment determine the location at which the receiving equipment is operating. The receiving electronic equipment may be mobile equipment such as a vehicle or mobile computing equipment such as a cellular telephone or portable computer.

The receiving electronic equipment may include a satellite navigation system receiver for receiving satellite navigation system signals. The receiving electronic equipment can use the satellite navigation system signals, the location information from the wireless messages, and received signal strength indicator information from the wireless messages to identify the location of the receiving electronic equipment. The receiving electronic equipment can take actions based on the identified location. For example, the receiving electronic equipment may present alerts to a user or may update the position of an icon on a map that represents the location of the receiving electronic equipment.

Further features of the invention, its nature and various advantages will be more apparent from the accompanying drawings and the following detailed description of the preferred embodiments.

DETAILED DESCRIPTION

Electronic equipment may be provided with wireless transceiver circuitry. For example, receiving electronic equipment in a vehicle or cellular telephone may be provided with a satellite navigation system receiver for receiving and processing satellite navigation system signals to ascertain the location of the equipment. Transmitting electronic equipment such as equipment associated with roadside signs, traffic lights, buildings, and other stationary structures may be used to broadcast local wireless messages. Receiving electronic equipment such as a cellular telephone, equipment associated with a vehicle, or other mobile equipment may receive and process the local wireless messages. For example, electronic equipment may receive messages and, in processing the messages, may extract signal strength information such as received signal strength indicator information and location information associated with each broadcast source. This information may be used to supplement or replace location information derived from processing the satellite navigation system signals.

Figure 1:
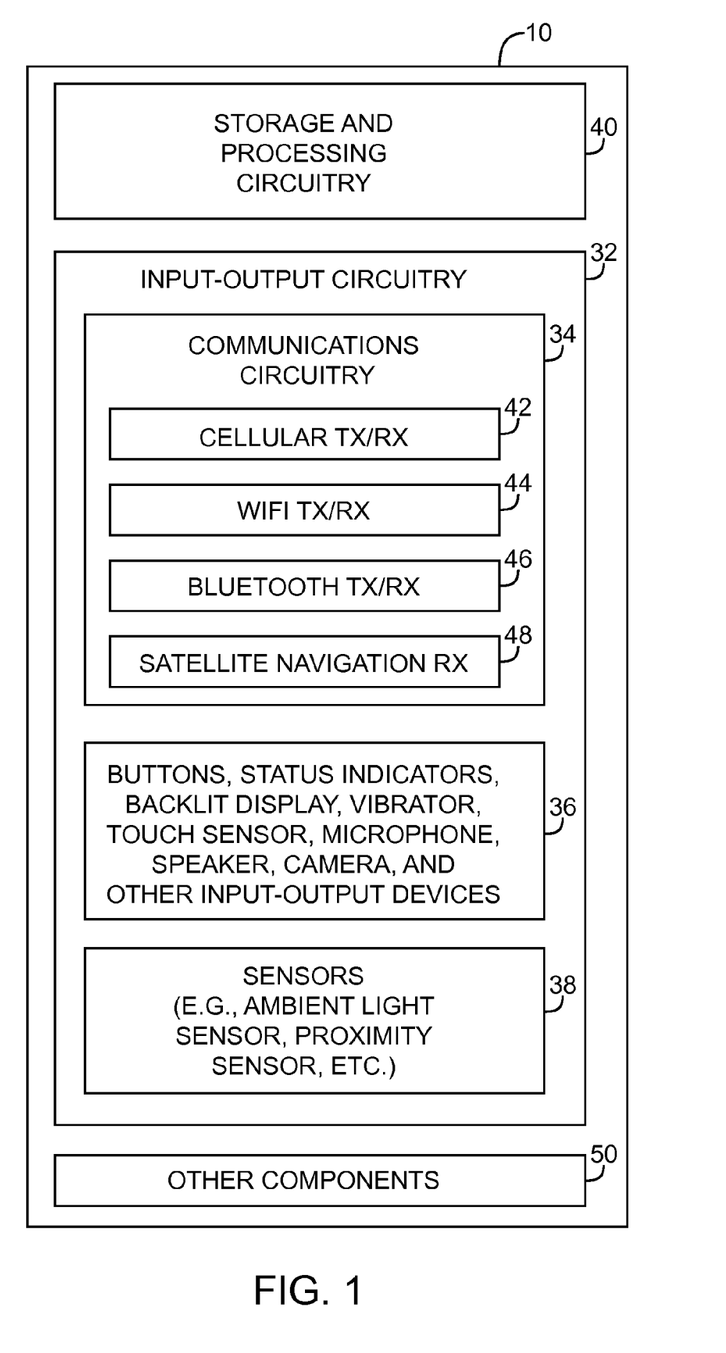
FIG. 1 is a schematic diagram of illustrative electronic equipment in accordance with an embodiment of the present invention.

Illustrative electronic equipment of the type that may be used in broadcasting and receiving wireless signals such as these is shown in FIG. 1. In a typical system, one or more pieces of equipment such as electronic equipment 10 may be used in transmitting and receiving wireless signals. For example, a system may include one or more mobile pieces of electronic equipment and one or more stationary pieces of electronic equipment. A vehicle may, for example, receive wireless information that is being broadcast by multiple stationary wireless broadcast units.

Electronic equipment such as equipment 10 of FIG. 1 may be a cellular telephone, tablet computer or other portable computer, embedded equipment in a vehicle, or other mobile electronic equipment. Equipment 10 may also be stationary equipment such as stationary transmitting equipment attached to the interior or exterior of a building, mounted alongside a roadway, mounted in a traffic light or traffic sign, or otherwise installed in a stationary location. Both transmitting equipment such as stationary equipment that transmits wireless messages and receiving equipment such as equipment in a vehicle or mobile device that receives the transmitted wireless messages may have bidirectional wireless capabilities (e.g., to support the transmission and receipt of data using protocols such as Bluetooth® protocols).

As shown in FIG. 1, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of equipment 10. The processing circuitry may be based on a processor such as a microprocessor and other suitable integrated circuits. With one suitable arrangement, storage and processing circuitry 40 may be used to run software on equipment 10, such as mapping applications (e.g., navigation applications for a vehicle or mobile device), email applications, media playback applications, operating system functions, software for capturing and processing images, software implementing functions associated with gathering and processing sensor data, software for issuing alerts and taking other actions when suitable criteria are satisfied, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). As shown in FIG. 1, circuitry 34 may include one or more radio-frequency transceivers such as cellular telephone transceiver circuitry 42 (e.g., one or more cellular telephone transmitters and/or receivers), IEEE 802.11 (WiFi®) transceiver circuitry (e.g., one or more wireless local area network transmitters and/or receivers), Bluetooth® transceiver circuitry 46 such as a Bluetooth® Low Energy (Bluetooth LE) transmitter and/or receiver, and satellite navigation system receiver circuitry (e.g., a Global Positioning System receiver or other satellite navigation system receiver).

Input-output circuitry 32 may include input-output devices 36 such as buttons, joysticks, click wheels, scrolling wheels, touch screens, other components with touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, keyboards and other equipment for gathering input from a user or other external source and/or generating output for a user.

Sensor circuitry such as sensors 38 of FIG. 1 may include an ambient light sensor, proximity sensor, temperature sensor, accelerometer, and other sensors for gathering data for equipment 10.

Equipment 10 may also include other components 50. For example, equipment 10 may form some or all of a vehicle including parts such as a chassis, wheels connected to the chassis, a motor for driving the wheels, a body for enclosing the motor and chassis, brakes, lights, audio and video equipment, navigation system equipment, a steering wheel, and other components for controlling the vehicle, gathering input from a user (driver) of the vehicle, and supplying output to the user of the vehicle. In scenarios in which equipment 10 is installed at a stationary location, other components 50 may include part of a street sign, part of a guard rail for a road, part of a traffic light, part of other traffic equipment, part of a building, an equipment housing mounted to the exterior of a building or other support structure, part of a telephone pole, an equipment housing within the interior of a building, a kiosk, or other components associated with stationary structures inside and/or outside buildings.

Figure 2:
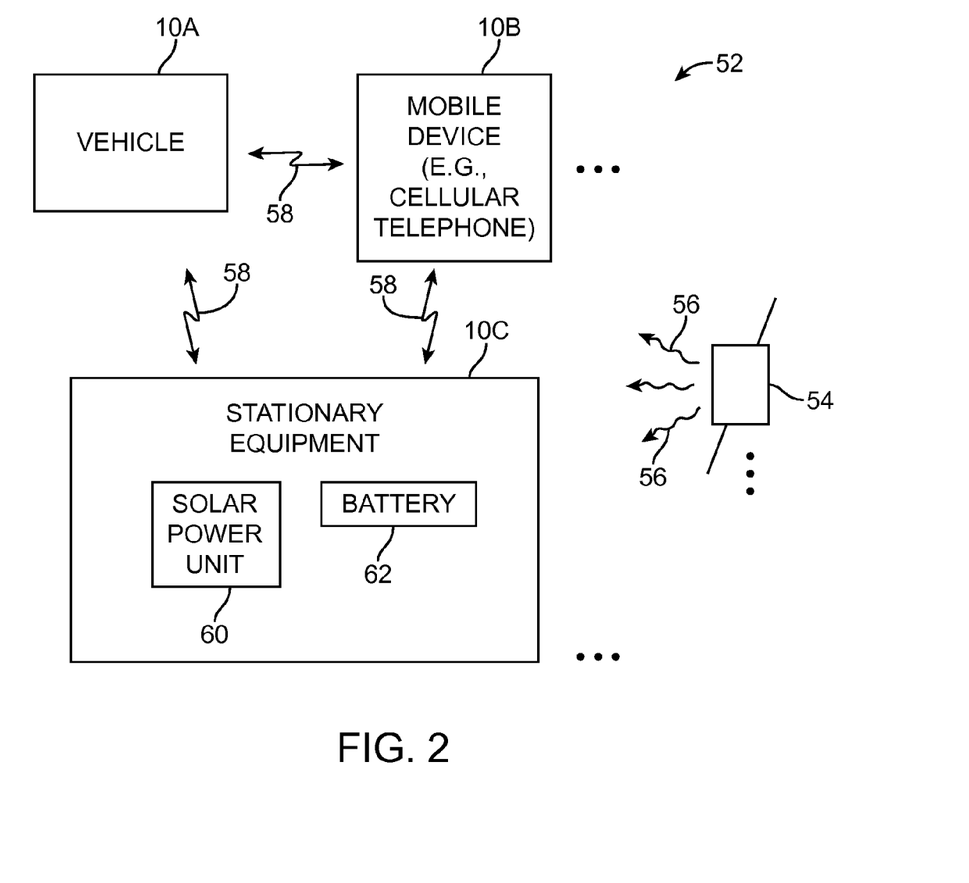
FIG. 2 is a diagram showing how multiple pieces of equipment in a system may wirelessly interact with each other and with external satellite navigation system equipment in accordance with an embodiment of the present invention.

FIG. 2 is a system diagram showing how multiple pieces of electronic equipment 10 may wirelessly interact with each other. As shown in FIG. 2, system 52 may include multiple pieces of electronic equipment 10 (FIG. 1) such as mobile (portable) electronic equipment 10A (e.g., a moving vehicle) and 10B (e.g., a cellular telephone, portable computer, or other mobile electronic device). System 52 may also include one or more stationary pieces of equipment such as stationary equipment 10C. Equipment 10A, 10B, and 10C may exchange wireless signals 58 (e.g., Bluetooth LE signals and/or other wireless signals). If desired, equipment 10 such as stationary equipment 10C may be provided with power sources such as solar power unit 60 and/or battery 62. Solar power unit 60 and battery 62 may be used, for example, to power roadside equipment installations even in the absence of a readily available source of alternating current (AC) line power.

Equipment such as equipment 10A and 10B (and, if desired, equipment 10C) may use satellite navigation system receiver circuitry such as satellite navigation receiver 48

(FIG. 1) to receive satellite navigation system signals 56 from a constellation of satellites 54. Satellites 54 may be, for example, GPS satellites. Using receiver circuitry 48, equipment 10 (e.g., mobile equipment 10A and 10B and, if desired, stationary equipment 10C) can ascertain its location. For example, a vehicle and determine its location and a cellular telephone can determine its location.

In challenging environments such as urban canyons, it may be difficult to accurately process satellite navigation system signals 56. Accordingly, in environments such as these, mobile equipment such as vehicle 10A and/or mobile device 10B may use information from Bluetooth LE advertisement messages (e.g., signals 58) from stationary equipment such as equipment 10C to help refine satellite navigation position information or, if no satellite navigation position information is available, to help determine location without use of satellite data.

As an example, vehicle 10A may ascertain its general location using a GPS signal, but may rely on signal strength measurements from one or more pieces of stationary equipment 10C to accurately identify the location of vehicle 10A. Triangulation techniques, time-of-flight techniques, or other techniques for ascertaining location using Bluetooth LE messages or other local wireless signals 58 may be used. To assist mobile equipment such as vehicle 10A and mobile device 10B in obtaining location information using Bluetooth LE messages, each message may be broadcast at a known (e.g., calibrated) signal strength and each message may include information on the location of the broadcasting equipment (e.g., X, Y, Z coordinates or other suitable location information).

The Z coordinate in the X, Y, Z coordinates may correspond to the vertical location (height) of the stationary equipment. It may be difficult to vertically locate vehicle 10A with a desired amount of accuracy in vertical dimension Z using commercially available GPS equipment, because commercially available GPS equipment may not offer sufficient vertical resolution to determine the vehicle location (e.g., when a vehicle is travelling on one of multiple levels in a multi-level roadway). By embedding stationary equipment 10C in each level in a multilevel roadway, mobile equipment such as vehicle 10A may be provided with information on which level vehicle 10A is located on (either from information such as a transmitted Z location from equipment 10C or transmitted roadway level information).

When mobile equipment receives the Bluetooth LE messages that have been transmitted by stationary equipment such as stationary equipment 10C, the mobile equipment may use storage and processing circuitry 40 or other circuitry to determine the signal strength of the received Bluetooth LE signal. Mobile equipment 10A or 10B may, for example, compute a received signal strength value such as the received signal strength indicator (RSSI) for the Bluetooth LE signal.

The magnitude of the RSSI value(s) that are received by the mobile equipment may be used to determine the distance of the receiving equipment from the transmitting equipment. In situations in which only a single message is received and only a single RSSI value is therefore computed, the receiving equipment can use the single RSSI value that is received to help compute the location of the equipment relative to the known location of the transmitting equipment. For example, if the RSSI value is strong, the receiving equipment can conclude that the receiving equipment is located adjacent to the Bluetooth LE transmitter.

If first and second RSSI parameters are received from respective first and second Bluetooth LE transmitters, analysis of the RSSI parameters and location information contained in the Bluetooth LE messages from the first and second Bluetooth LE transmitters can be used to ascertain the relative position between the receiving equipment and the respective first and second transmitters. Triangulation may then be used to determine the location of the receiving equipment.

In situations in which no GPS location information is available, the location of the equipment that is determined by analyzing the locations and RSSI values of the transmitting pieces of equipment can be used to determine the location of the receiving equipment. In situations in which weak and/or potentially inaccurate GPS location data is available, the information on the location of the equipment that is determined by analyzing the locations and RSSI values of the transmitting pieces of equipment can be used to help more accurately determine the location of the receiving equipment.

The transmission of Bluetooth LE messages may consume relatively little power due to the relatively high power efficiency of the Bluetooth LE protocol. Each transmitted Bluetooth LE advertisement message may have about 32 bits of information spread across one or more predefined data fields. As an example, a message may have N data fields that are associated with N respective types of information. A first data field may be used to hold information on the location of the transmitting equipment, a second data field may be used to hold information about the transmitting equipment or the surrounding environment (e.g., driving conditions), etc. If desired, flags can be used to denote different types of data within a Bluetooth LE advertisement message.

Figure 3:
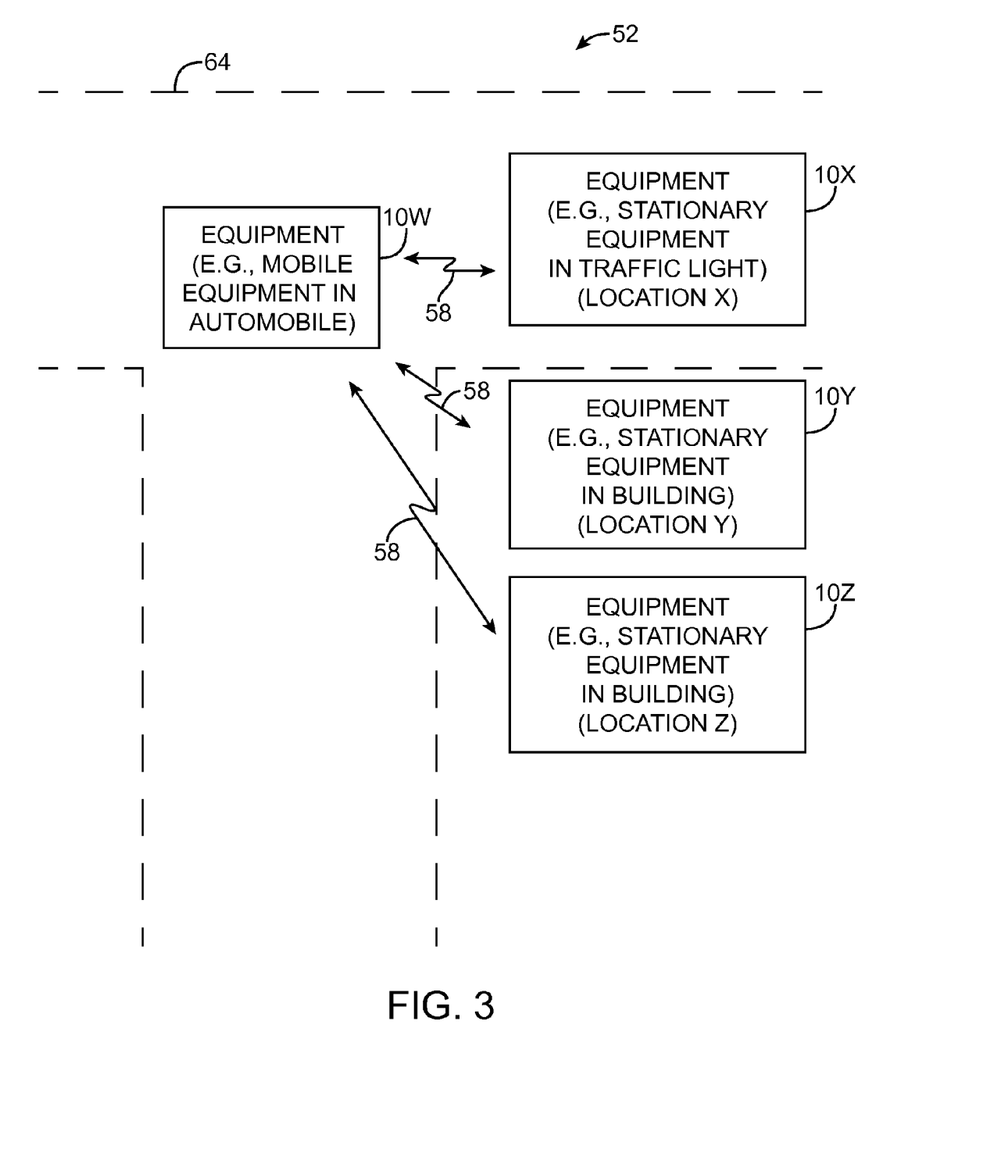
FIG. 3 is a diagram showing how mobile equipment may wirelessly interact with stationary equipment in accordance with an embodiment of the present invention.

As shown in FIG. 3, equipment such as mobile equipment 10W (e.g., a vehicle) may receive Bluetooth LE messages (wireless signals 58) from multiple pieces of stationary equipment such as equipment 10X (e.g., a traffic light or other traffic equipment having circuitry of the type shown in FIG. 1) and equipment 10Y and 10Z (e.g., stationary equipment associated with respective first and second buildings in the example of FIG. 3). Vehicle 10W may be driven by a user along road 64. Due to tall buildings or other structures, it may be difficult or impossible for mobile electronic equipment 10W to obtain accurate GPS location information that identifies the position of equipment 10W. Equipment 10W may therefore receive and process three Bluetooth LE messages from equipment 10X, 10Y, and 10Z, respectively.

Each message received by receiving equipment 10W may include information on the location of the transmitting equipment. For example, Bluetooth LE messages from equipment 10X may contain information on the location (location X) of equipment 10X, Bluetooth LE messages from equipment 10Y may contain information on the location (location Y) of equipment 10Y, and Bluetooth LE messages from equipment 10Z may contain information on the location (location Z) of equipment 10Z. As equipment 10W receives each message, equipment 10W may compute an RSSI value corresponding to each piece of transmitting equipment. For example, equipment 10W may receive Bluetooth LE signals from equipment 10X with a first RSSI value, may receive Bluetooth LE signals from equipment 10Y with a second RSSI value, and may receive Bluetooth LE signals from equipment 10Z with a third RSSI value. By evaluating the positions of locations X, Y, and Z and by evaluating the corresponding RSSI values from the equipment at these locations, equipment 10W can determine the location of equipment 10W (e.g., using triangulation) more accurately than if equipment 10W were to rely solely on GPS data. If, for example, the RSSI value associated with equipment 10X is strong and the RSSI values from equipment 10Y and 10Z are weak, equipment 10W can conclude that equipment 10W is at the position on road 64 that is illustrated in FIG. 3 (i.e., adjacent to equipment 10X).

Figure 4:
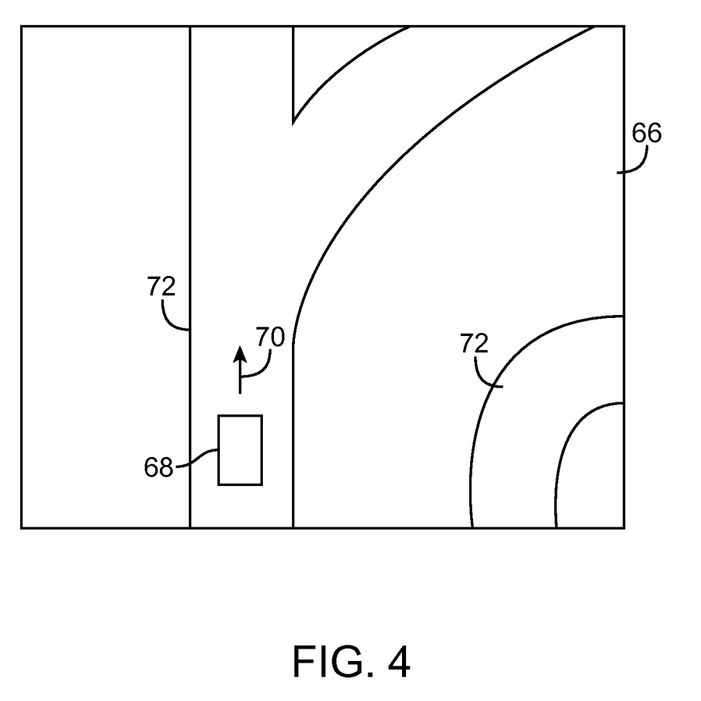
FIG. 4 shows an illustrative display screen of the type that may be presented by a mapping application that is displaying a map with stationary objects such as roads in accordance with an embodiment of the present invention.

As shown in FIG. 4, electronic equipment 10 may display a map such as map 66 on a display (e.g., a navigation system display in a vehicle or a display screen in a cellular telephone or other portable computing equipment). Map 66 may be displayed by a mapping application or other software that is implemented on control circuitry 40 (FIG. 1). Map 66 may contain features such as geographical features, buildings, points of interest, etc. As shown in FIG. 4, map 66 may have roads (streets) such as roads 72 on which an icon such as icon 68 may be displayed to represent the current location of equipment 10 (e.g., a vehicle). In the example of FIG. 4, vehicle icon 68 is traveling in direction 70. By using RSSI information from nearby Bluetooth LE transmitters and location information extracted from the Bluetooth LE messages transmitted by those transmitters, electronic equipment 10 may accurately ascertain the location of equipment 10, so that the position of vehicle icon 68 may be accurately displayed on map 66.

Figure 5:
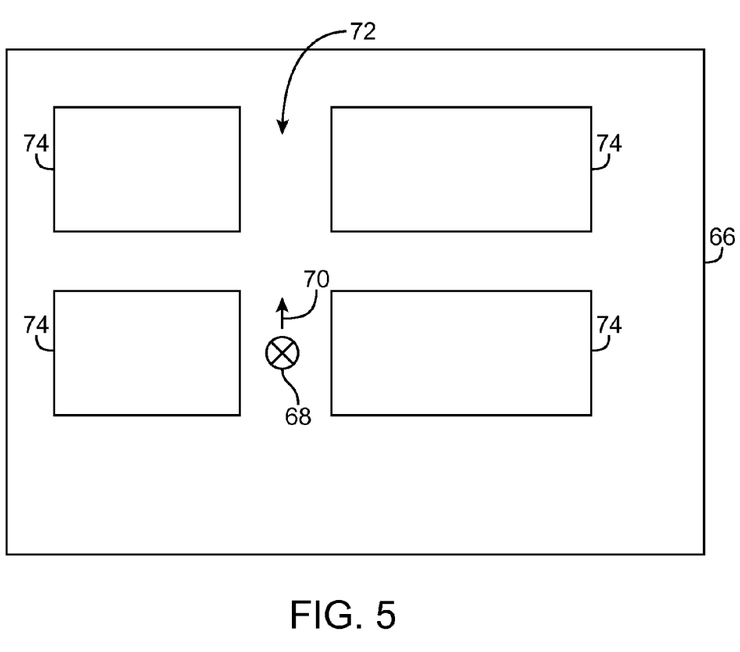
FIG. 5 shows an illustrative display screen of the type that may be presented by a mapping application that is displaying a map containing stationary objects such as interior or exterior building structures in accordance with an embodiment of the present invention.

If desired, map 66 may contain features such as structures 74 that are separated by paths 72. Map 66 may correspond to a collection of buildings, a building interior, or other environment. Equipment icon 68 may correspond to the location of equipment 10 (e.g., a vehicle or a cellular telephone or other equipment being held by a user). In the example of FIG. 5, icon 68 is moving along path 72 between structures 74 in direction 70. To accurately ascertain the position of icon 68 within map 66, electronic equipment 10 may gather RSSI information and location information from one or more transmitting pieces of electronic equipment 10 within a campus or building interior (as examples).

Figure 6:
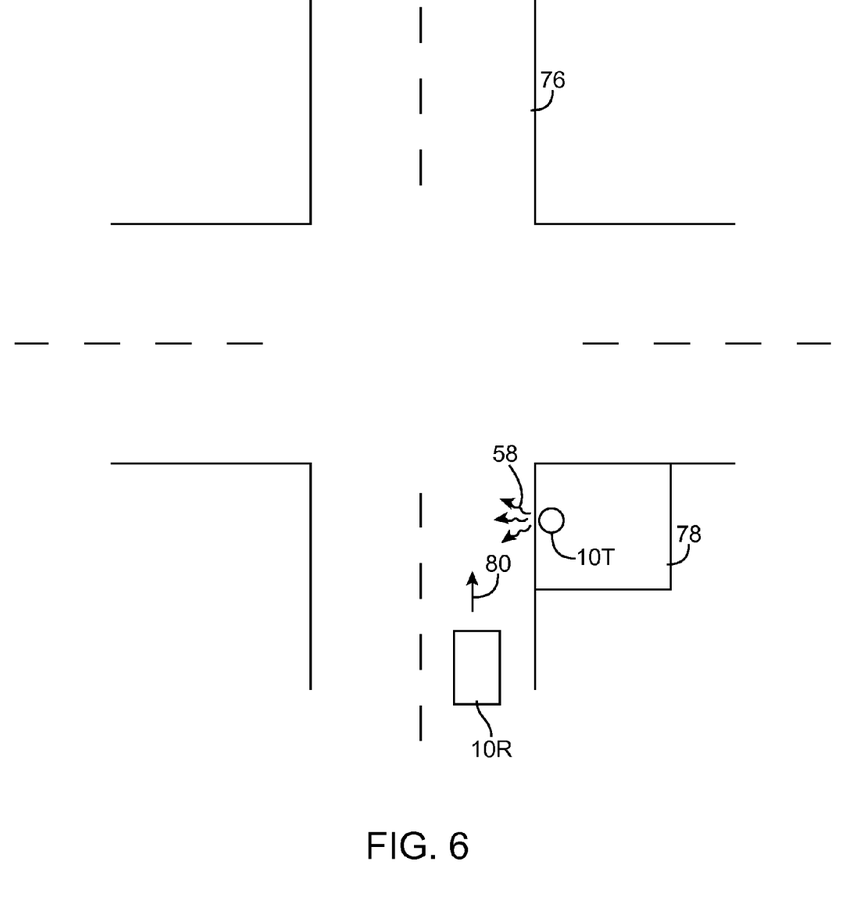
FIG. 6 is a diagram of an operating environment with roads and buildings and local wireless transmitting equipment in accordance with an embodiment of the present invention.

As shown in FIG. 6, buildings such as building 78 and other structures may be located adjacent to roads such as road 76. In urban canyon environments, it may be challenging for electronic equipment such as vehicle 10R to obtain accurate position information using only satellite navigation equipment, so vehicle 10R may monitor for transmitted Bluetooth LE advertisement messages from equipment 10T (e.g., local wireless signals 58). In the example of FIG. 6, vehicle 10R is moving in direction 80 along road 76. When vehicle 10R passes near to transmitter equipment 10T, vehicle 10R may sense that the RSSI value of transmitter 10T is high and may therefore conclude that vehicle 10R is adjacent to the location of equipment 10T (i.e., structure 78). Vehicle 10R may use mapping software to display an icon on a map that represents the current position of vehicle 10R.

Figure 7:
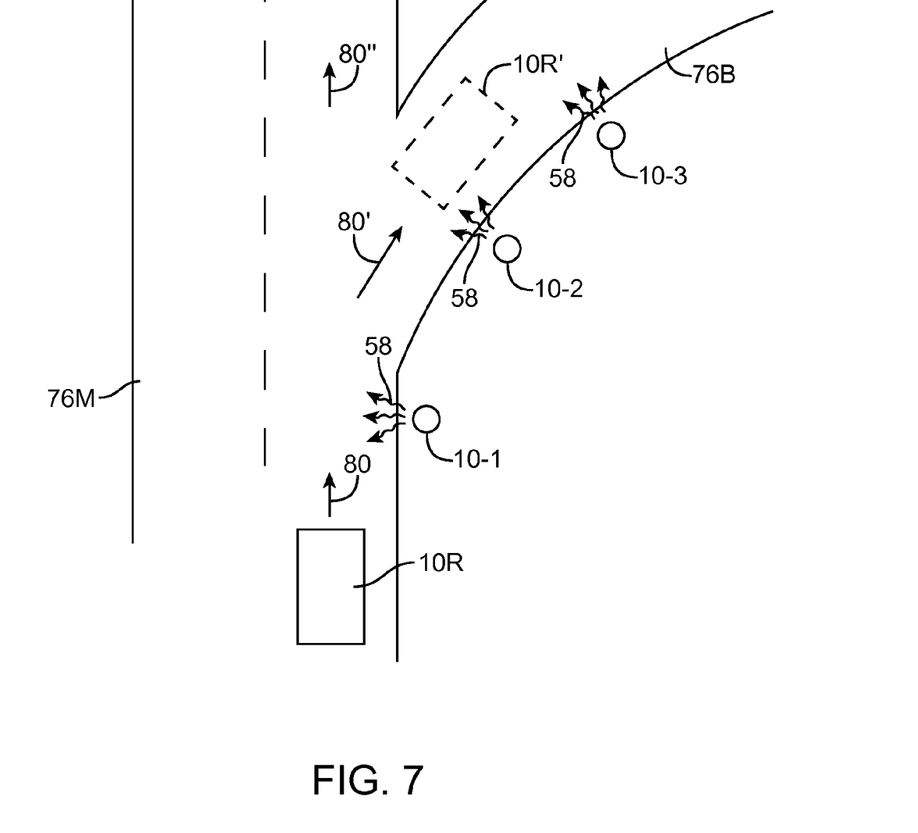
FIG. 7 is a diagram of a road showing how wireless equipment that is located at stationary locations near the road may be used in helping to ascertain the location of mobile electronic equipment in accordance with an embodiment of the present invention.

If desired, Bluetooth LE transmitters in equipment 10 may be mounted along the side of a roadway in the vicinity of forks in the road, curves in the road, or other environments in which it is desired to determine the position of a vehicle with a high degree of accuracy. As shown in FIG. 7, for example, electronic equipment 10-1, 10-2, and 10-3 may be mounted along the side of right-hand branch 76B of road 76M. Vehicle 10R may travel in direction 80. As a user exits path 76M and travels along road branch 76B in direction 80' as illustrated by vehicle 10R', vehicle 10R may pass successive pieces of equipment such as equipment 10-1, 10-2, and 10-3, each of which is transmitting a unique Bluetooth LE advertisement message containing its location and having an associated RSSI value. By monitoring the Bluetooth LE messages, vehicle 10R may accurately determine that vehicle 10R is traveling in direction 80' along path 76B rather than traveling in direction 80" along path 76M.

Figure 8:
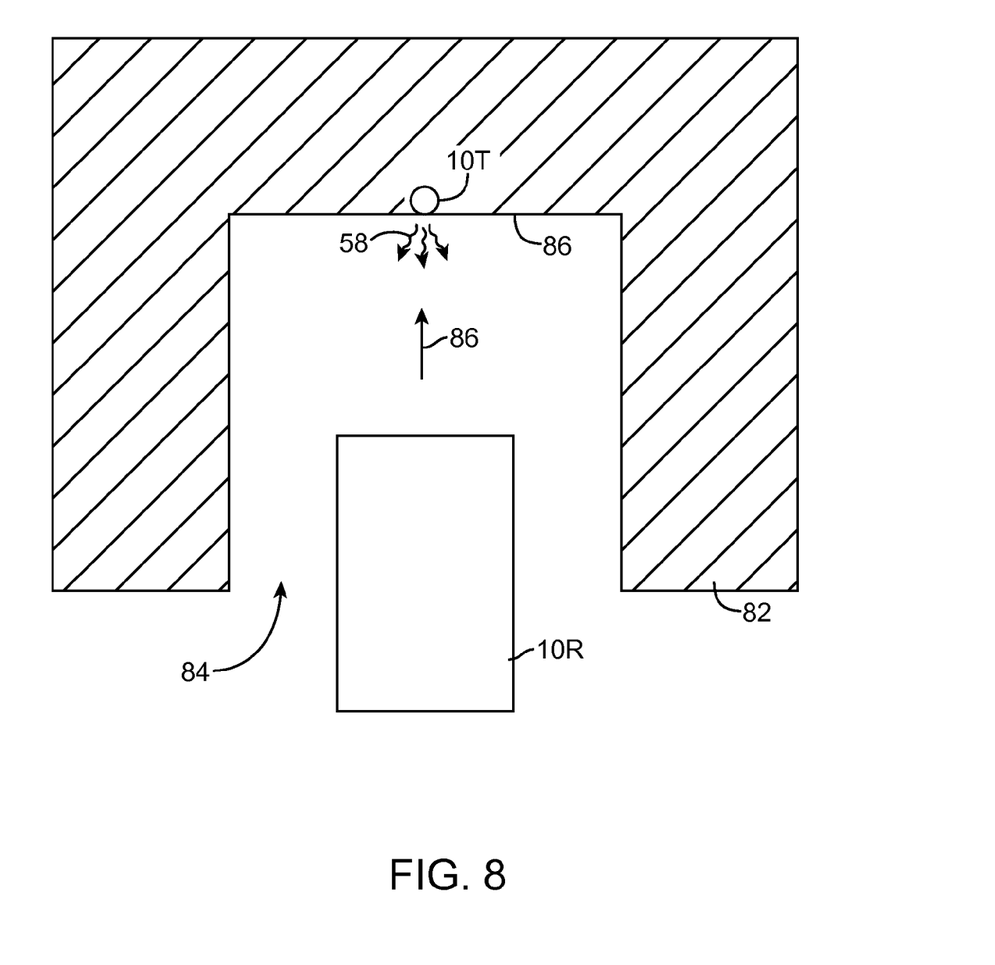
FIG. 8 is a diagram showing how a vehicle can wirelessly gather information to help ascertain the vehicle's location and thereby assist in parking the vehicle in accordance with an embodiment of the present invention.

Bluetooth LE transmissions may be used to help locate the position of a vehicle relative to a structure such as a parking garage. This type of situation is illustrated in FIG. 8. In the example of FIG. 8, vehicle 10R is moving in direction 86 in an attempt to park within opening 84 in garage structure 82. Electronic equipment 10T may be mounted adjacent to rear surface 86 of garage recess 84. Equipment 10T may transmit wireless signals 58 such as Bluetooth LE advertisement messages. Vehicle 10R may receive the Bluetooth LE messages and may use location information and RSSI information from the messages to determine the position of vehicle 10R with respect to rear wall 86 of garage opening 84.

Equipment 10 may, if desired, include information on traffic conditions, road conditions, or other driving conditions in the transmitted Bluetooth LE advertisement messages. Consider, as an example, a situation of the type shown in FIG. 9 in which vehicle 10R is being driven along road 90 in direction 92. Electronic equipment 10 such as equipment 10', 10", and 10''' may be installed at locations along the edge of road 90.

Initially, a driver of vehicle 10R may be subject to a 55 mph speed limit. This speed limit may be posted using a speed limit sign. The speed limit may also be broadcast using Bluetooth LE signals 58 from equipment 10' and displayed on a display in receiving equipment 10R. To provide the driver with advanced notice of upcoming traffic-related items such as a change in the speed limit, equipment such as equipment 10" may transmit Bluetooth LE messages that contain information on upcoming speed limits (e.g., the "45 mph ahead" message that is being transmitted by electronic equipment 10" of FIG. 9). When equipment 10R receives this message, equipment 10R may display a corresponding alert for the driver on a display in equipment 10R and/or may generate an audible alert for the user (e.g., a recorded or synthesized voice, a tone, a chime, etc.). The alert may inform the user of the upcoming change in the speed limit. Once vehicle 10R reaches the vicinity of transmitter 10''', vehicle 10R may receive information on the current speed limit of 45 mph in a Bluetooth LE transmission from electronic equipment 10'''. In general, information on any type of driving condition or other information can be transmitted from equipment 10 using Bluetooth LE (or other wireless protocol). As an example, weather alerts, bridge height alerts, traffic congestion alerts, commercial messages, or other information may be transmitted.

Figure 9:
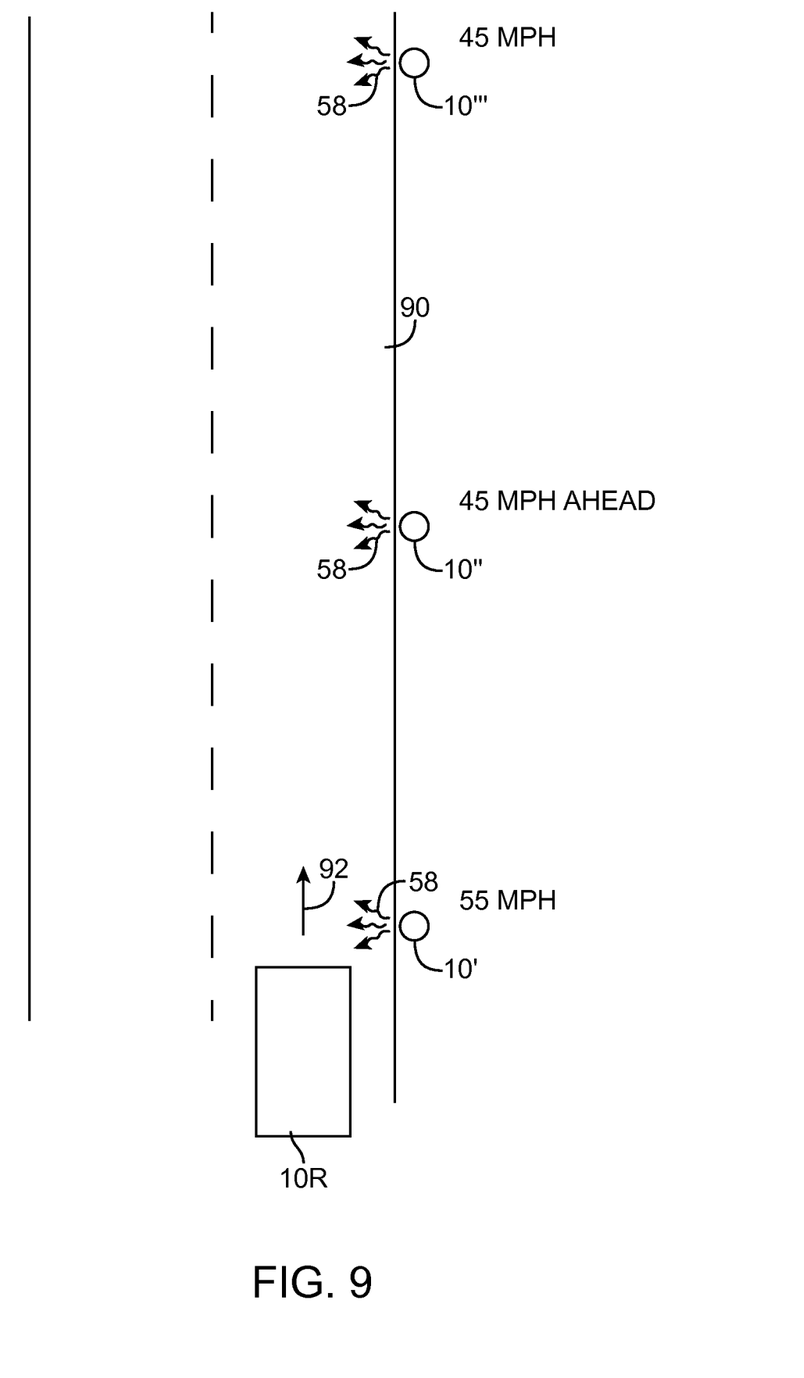
FIG. 9 is a diagram of a road with wireless equipment that is being used to advertise information about road conditions to passing vehicles in accordance with an embodiment of the present invention.
Figure 10:
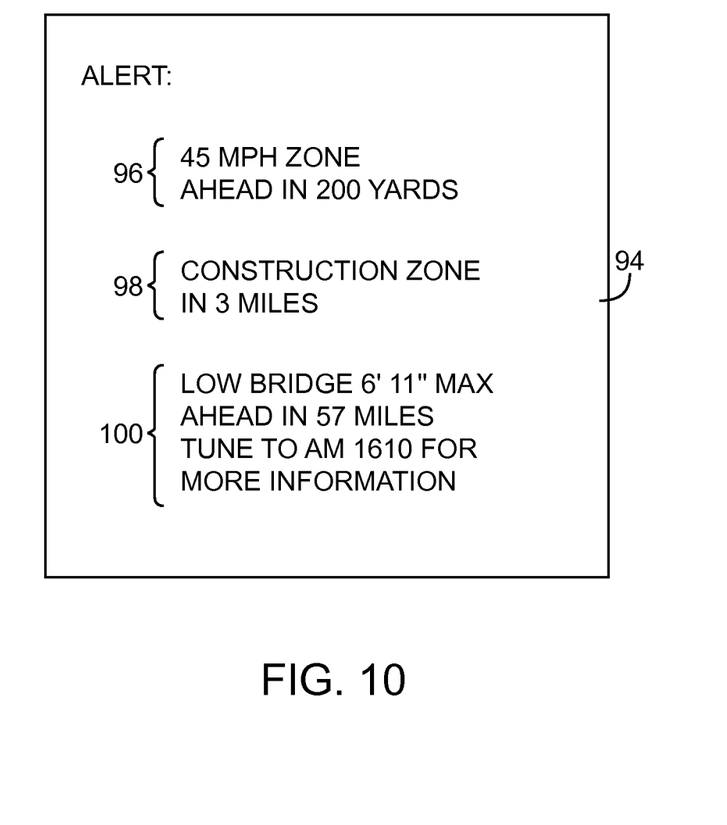
FIG. 10 shows an illustrative display screen of the type that may be presented to alert a driver of a vehicle to upcoming road conditions in accordance with an embodiment of the present invention.

FIG. 10 is a diagram of an illustrative display screen of the type that may be presented to a driver of vehicle 10R when vehicle 10R has received information from electronic device 10" of FIG. 9 regarding an upcoming reduction in the posted speed limit. As shown in FIG. 10, the alert that is displayed on display 94 in equipment 10R may include information 96 that informs the driver of an upcoming speed limit and the distance left before that speed limit becomes effective. The alert may also include information 98 on other driving conditions such as upcoming construction and the distance remaining before reaching the upcoming construction. Information 100 may be included on bridges and other structures. Vehicle 10R may filter out information that is not relevant to the driver of vehicle 10R. For example, if vehicle 10R is a truck with a height of 7 feet, alert information 100 may be displayed informing the driver that an upcoming bridge has a maximum allowable height of 6 feet and 11 inches. If, however, vehicle 10R is a car with a height of 5 feet (5'), the bridge height alert of information 100 may be omitted to avoid cluttering display 94. If desired, information such as information 100 may include instructions to tune to a radio channel where more information is available for the driver.

Figure 11:
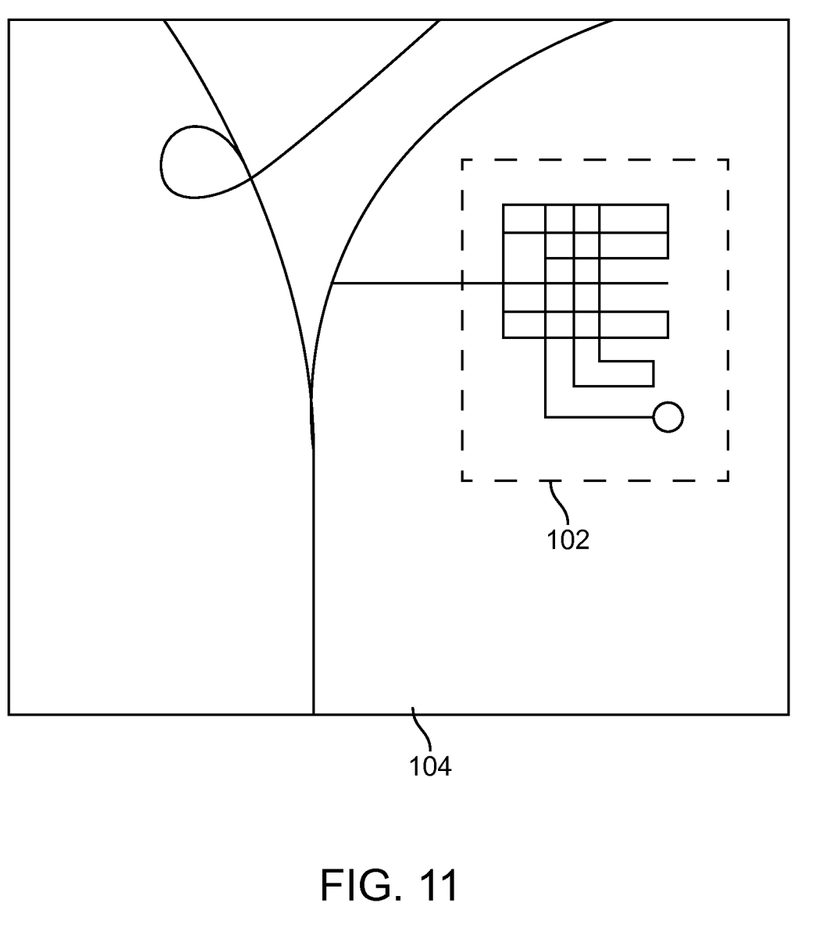
FIG. 11 is a diagram showing how certain geographic locations may be identified by electronic equipment to denote areas in which it is difficult to rely solely on satellite navigation system signals so that wireless messages should be used to help ascertain the location of the electronic equipment in accordance with an embodiment of the present invention.

Certain geographic areas such as areas with tall buildings or other urban canyon features may be prone to loss of accurate GPS location information. If desired, equipment 10 may maintain information in a database that indicates which geographic areas are likely to have poor GPS reception. In those areas, such as illustrative urban canyon area of map 104 of FIG. 11, equipment 10 may automatically revert to monitoring surroundings for Bluetooth LE messages from transmitting equipment 10. Outside of area 102, where GPS signaling is generally known to be satisfactory, the monitoring of Bluetooth LE transmissions can be vehicle may avoided or used only upon detecting a weak GPS signal. Within area 102, equipment 10 may monitor for incoming Bluetooth LE transmissions by default (as an example).

Figure 12:
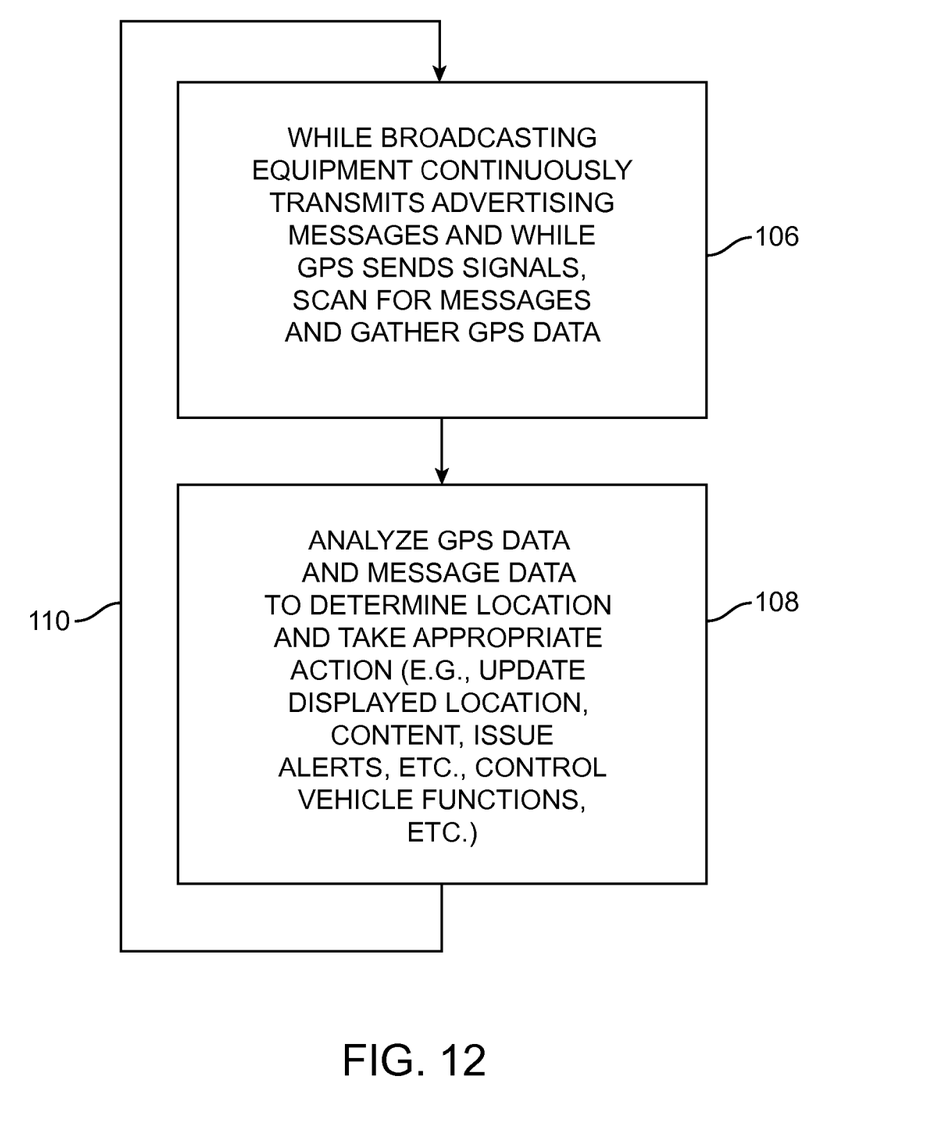
FIG. 12 is a flow chart of illustrative steps involved in wirelessly gathering signals such as locally broadcast wireless messages to use in ascertaining location in accordance with an embodiment of the present invention.

A flow chart of illustrative steps involved in operating electrical equipment 10 in a system of the type shown in FIG. 2 is shown in FIG. 12. At step 106, while transmitting electronic equipment 10 (e.g., one or more pieces of stationary equipment 10) is transmitting messages (e.g., Bluetooth LE advertisement messages) and while satellite navigation system satellites 54 are transmitting satellite signals 56 (e.g., GPS signals), a vehicle, cellular telephone or other receiving electronic equipment (e.g., mobile receiving electronic equipment) may be used to monitor for incoming messages (e.g., Bluetooth LE advertisements messages) and may be used to receive satellite signals 56 from the satellite navigation system satellites 54.

At step 108, the receiving electronic equipment may analyze the received satellite navigation system signals and the Bluetooth LE messages to determine the location of the receiving electronic equipment. Once the location of the receiving electronic equipment has been determined, the receiving electronic equipment may take suitable action. For example, the electronic equipment may display a map or other information that contains an automobile icon or other icon that is positioned at an up-to-date location within the map. Alerts may be issued related to driving conditions or other conditions. If desired, electronic equipment 10 may use control circuitry 40 to control other components 50. For example, if it is determined that a vehicle is about to strike an object, control circuitry 40 may direct the brakes in the vehicle to slow the vehicle. If it is determined that the vehicle is drifting out of a lane of traffic, the steering of the vehicle may be adjusted. Processing may then return to step 106, as indicated by line 110.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating receiving electronic equipment at a location, comprising:
   with the receiving electronic equipment, receiving wireless advertisement messages containing location data from stationary transmitting electronic equipment, wherein the receiving electronic equipment forms part of a vehicle of a given type;
   analyzing the received wireless advertisement messages with the receiving electronic equipment to generate corresponding received signal strength indicator information;
   with the receiving electronic equipment, using the location data and the received signal strength indicator information to identify the location of the receiving electronic equipment;
   presenting a user of the receiving electronic equipment with an alert based on the location of the receiving electronic equipment, wherein presenting the user with the alert comprises displaying information for the user based at least partly on the given type of the vehicle; and
   updating a map based on analyzing the received wireless advertisement messages.

2. The method defined in claim 1 wherein receiving the wireless advertisement messages comprises receiving Bluetooth Low Energy (LE) messages.

3. The method defined in claim 2 wherein the transmitting electronic equipment is located adjacent to a road and wherein receiving the wireless advertisement messages comprises receiving wireless signals from the transmitting electronic equipment that is located adjacent to the road while the receiving electronic equipment is located on the road.

4. The method defined in claim 3 wherein the receiving electronic equipment comprises portable computing equipment and wherein receiving the wireless advertisement messages comprises receiving wireless advertisement messages with the portable computing equipment.

5. The method defined in claim 1 wherein the receiving electronic equipment forms part of a vehicle traveling on a road and wherein the transmitting equipment comprises equipment mounted adjacent to the road.

6. The method defined in claim 5 wherein the road includes a branch and wherein the method comprises positioning an icon on the branch in response to analyzing the received wireless advertisement messages.

7. The method defined in claim 1 wherein presenting the user with the alert comprises displaying information for a driver of the vehicle with information on driving conditions.

8. The method defined in claim 1 further comprising:
   with the receiving electronic equipment, processing satellite navigation system signals to help determine the location of the receiving electronic equipment.

9. The method defined in claim 1 further comprising:
   receiving satellite navigation system signals from satellites using a satellite navigation system receiver in the receiving electronic equipment.

10. The method defined in claim 9 further comprising:
    determining whether to use the received wireless advertisement messages to help identify the location of the receiving electronic equipment in addition to the satellite navigation system signals based on a determination of whether a geographic position of the receiving electronic equipment is within a predetermined geographic area.

11. A method for operating receiving electronic equipment at a location, comprising:
    with the receiving electronic equipment, receiving wireless advertisement messages containing location data from stationary transmitting electronic equipment, wherein the receiving electronic equipment is part of a vehicle of a given type being driven on a road by a driver;
    receiving satellite navigation system signals from satellites using a satellite navigation system receiver in the receiving electronic equipment;
    analyzing the received wireless advertisement messages with the receiving electronic equipment to generate corresponding received signal strength indicator information;
    with the receiving electronic equipment, using the location data and the received signal strength indicator information to identify the location of the receiving electronic equipment; and
    displaying information on the receiving electronic equipment for the driver based on the given type of the vehicle, wherein the information includes a map that includes an icon representing the location of the receiving electronic equipment as determined using both the received satellite navigation system signals and the received wireless advertisement messages.

12. The method defined in claim 1 wherein displaying the information to the user comprises:
  displaying a first set of information when the vehicle is a first type of vehicle; and
  displaying a second set information that is different from the first set of information when the vehicle is a second type of vehicle that is different from the first type of vehicle.

13. The method defined in claim 1 further comprising:
  receiving the information at the receiving electronic equipment; and
  filtering the information to separate information that is relevant to the user from information that is not relevant to the user, wherein displaying the information for the user comprises:
    displaying the information that is relevant to the user while omitting the information that is not relevant to the user.

14. The method defined in claim 9, further comprising:
  determining whether to use the received wireless advertisement messages to help identify the location of the receiving electronic equipment in addition to the received satellite navigation system signals based on a signal strength of the received satellite navigation system signals.

* * * * *